US012791983B2

(12) United States Patent
Hiraya

(10) Patent No.: US 12,791,983 B2
(45) Date of Patent: Nov. 10, 2026

(54) ELECTRONICALLY CONTROLLED MECHANICAL WATCH

(71) Applicant: SEIKO EPSON CORPORATION, Tokyo (JP)

(72) Inventor: Eiichi Hiraya, Shiojiri (JP)

(73) Assignee: SEIKO EPSON CORPORATION (JP)

(*) Notice: Subject to any disclaimer, the term of this patent is extended or adjusted under 35 U.S.C. 154(b) by 396 days.

(21) Appl. No.: 18/460,904

(22) Filed: Sep. 5, 2023

(65) Prior Publication Data

US 2024/0085856 A1 Mar. 14, 2024

(30) Foreign Application Priority Data

Sep. 6, 2022 (JP) ................................ 2022-141398

(51) Int. Cl.

| | |
|---|---|
| ***G04C 3/10*** | (2006.01) |
| ***G04B 5/10*** | (2006.01) |
| ***G04C 3/00*** | (2006.01) |
| ***G04C 10/00*** | (2006.01) |

(52) U.S. Cl.

CPC ............... *G04C 3/108* (2013.01); *G04B 5/10* (2013.01); *G04C 3/007* (2013.01); *G04C 10/00* (2013.01)

(58) Field of Classification Search

None

See application file for complete search history.

(56) References Cited

U.S. PATENT DOCUMENTS 4,320,482 A * 3/1982 Nakao .................... G04C 3/001 968/447
5,530,407 A 6/1996 Yabe et al.
6,485,172 B1 * 11/2002 Takahashi ................ G04B 5/14 368/208
6,567,345 B1 5/2003 Furukawa et al.

(Continued)

FOREIGN PATENT DOCUMENTS

JP S57-166195 U 10/1982
JP S58-148994 A 9/1983

(Continued)

*Primary Examiner* — Edwin A. Leon
*Assistant Examiner* — Matthew Daniel Hwang
(74) *Attorney, Agent, or Firm* — Harness, Dickey & Pierce, P.L.C.

(57) ABSTRACT

An electronically controlled mechanical watch includes a time indication device including a time indication wheel train configured to indicate a time using a transmitted torque of a mechanical energy source, a circuit board on which a crystal oscillator, an electronic control circuit configured to adjust a rotation speed of the time indication wheel train based on an oscillation frequency of the crystal oscillator, and a plurality of logical regulation setting patterns are disposed, and a rotary switch including a conduction portion, the rotary switch being configured to rotate with respect to the circuit board to select one of the plurality of logical regulation setting patterns, conducting to the conduction portion, wherein the electronic control circuit includes an oscillation circuit, a frequency divider circuit, and a logical regulation circuit configured to control the frequency divider circuit based on a conduction state of the conduction portion and the logical regulation setting pattern.

10 Claims, 10 Drawing Sheets

(56) References Cited

U.S. PATENT DOCUMENTS

| | | | | |
|---|---|---|---|---|
| 2001/0030909 | A1* | 10/2001 | Shimizu ................ | G04C 11/00<br>368/204 |
| 2001/0046188 | A1 | 11/2001 | Koike et al. | |
| 2019/0369560 | A1 | 12/2019 | Yamazaki | |

FOREIGN PATENT DOCUMENTS

| | | | |
|---|---|---|---|
| JP | S58-167493 | U | 11/1983 |
| JP | H06-027265 | A | 2/1994 |
| JP | 2000-147167 | A | 5/2000 |
| JP | 2001-186719 | A | 7/2001 |
| JP | 2019-211465 | A | 12/2019 |

* cited by examiner

ELECTRONICALLY CONTROLLED MECHANICAL WATCH

The present application is based on, and claims priority from JP Application Serial Number 2022-141398, filed Sep. 6, 2022, the disclosure of which is hereby incorporated by reference herein in its entirety.

BACKGROUND

1. Technical Field

The present disclosure relates to an electronically controlled mechanical watch.

2. Related Art

An electronically controlled mechanical watch that accumulates, in a power supply circuit, electrical energy generated by driving a generator using mechanical energy when a mainspring is released, operates a crystal oscillator and a braking control circuit with the electrical energy, and controls rotation of a rotor of the generator based on an oscillation frequency of the crystal oscillator to accurately drive hands fixed to a wheel train and accurately indicate a time is known (JP-A-2019-211465).

In this electronically controlled mechanical watch, a logical regulation circuit that stores correction data for correcting individual differences in characteristics of the crystal oscillator, and inputs a set or reset signal to each division stage of a frequency divider circuit that divides the oscillation signal of the crystal oscillator, at a predetermined timing, to digitally lengthen or shorten a cycle time of a clock signal is used.

The oscillation frequency of the crystal oscillator fluctuates due to deterioration over time due to manufacturing, and thus, even when a rate of the watch is adjusted with the logical regulation circuit using the correction data stored at the time of product shipment, it is not possible to correct the time to the correct time, and time accuracy is likely to be degraded. Therefore, there is a demand for an electronically controlled mechanical watch that indicates a time using a torque from a mechanical energy source such as a mainspring, and that can maintain time accuracy even when a crystal oscillator deteriorates over time.

SUMMARY

An electronically controlled mechanical watch according to the present disclosure includes a mechanical energy source, a time indication device including a time indication wheel train configured to indicate a time using a transmitted torque of the mechanical energy source, a circuit board on which a crystal oscillator, an electronic control circuit configured to adjust a rotation speed of the time indication wheel train based on an oscillation frequency of the crystal oscillator, and a plurality of logical regulation setting patterns are disposed, and a rotary switch including a conduction portion configured to conduct to the plurality of logical regulation setting patterns, the rotary switch being configured to rotate with respect to the circuit board to select a logical regulation setting pattern, of the plurality of logical regulation setting patterns, conducting to the conduction portion, wherein the electronic control circuit includes an oscillation circuit configured to oscillate the crystal oscillator, a frequency divider circuit configured to divide an oscillation signal output from the oscillation circuit and output a reference signal, and a logical regulation circuit configured to control the frequency divider circuit based on a conduction state of the conduction portion and the logical regulation setting pattern.

DESCRIPTION OF EMBODIMENTS

Hereinafter, an electronically controlled mechanical watch 1 according to an embodiment of the present disclosure will be described with reference to the drawings. In the description of the embodiment, a "plan view" means a state viewed in a direction orthogonal to a dial 3, that is, a shaft direction of a pointer shaft, and a "side view" means a state viewed in a direction perpendicular to the pointer shaft.

Figure 1:
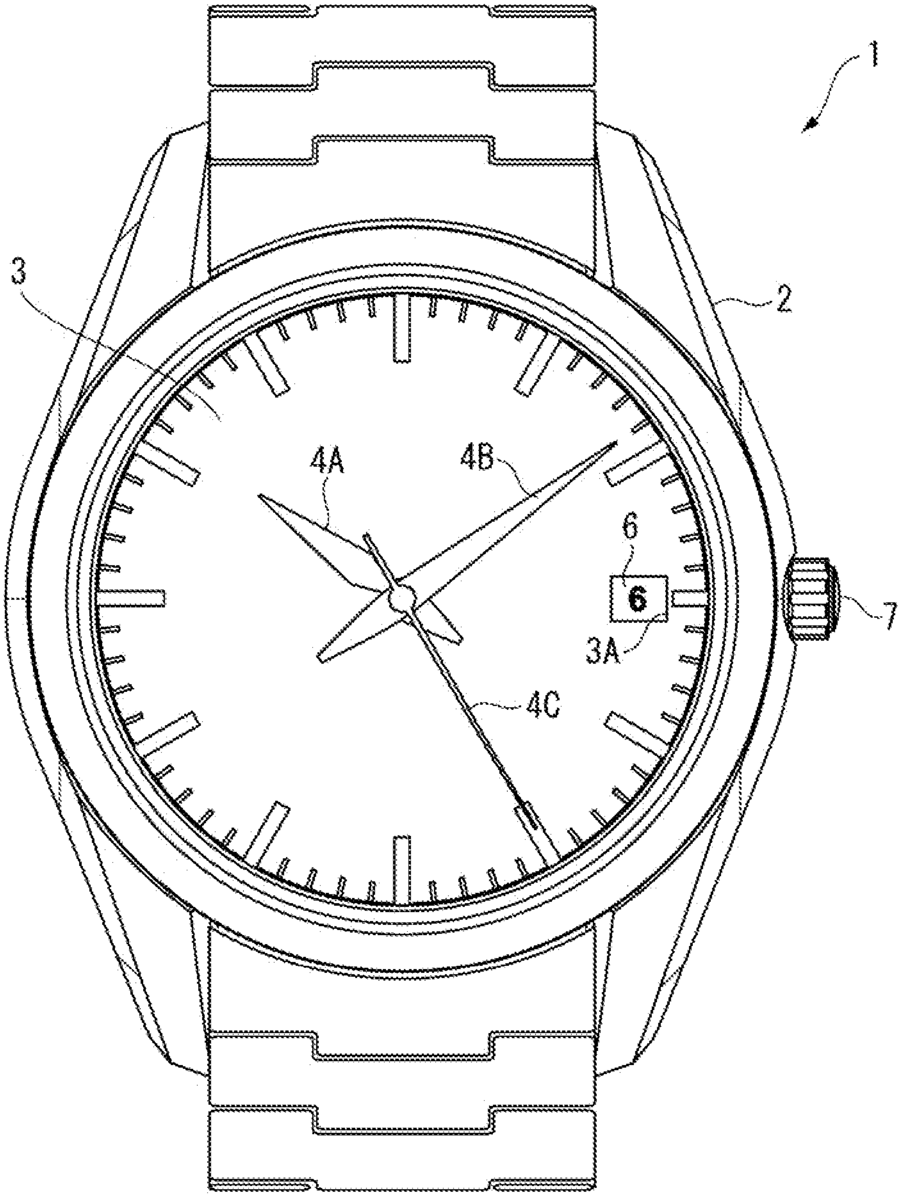
FIG. 1 is a front view illustrating an electronically controlled mechanical watch according to an embodiment.
Figure 2:
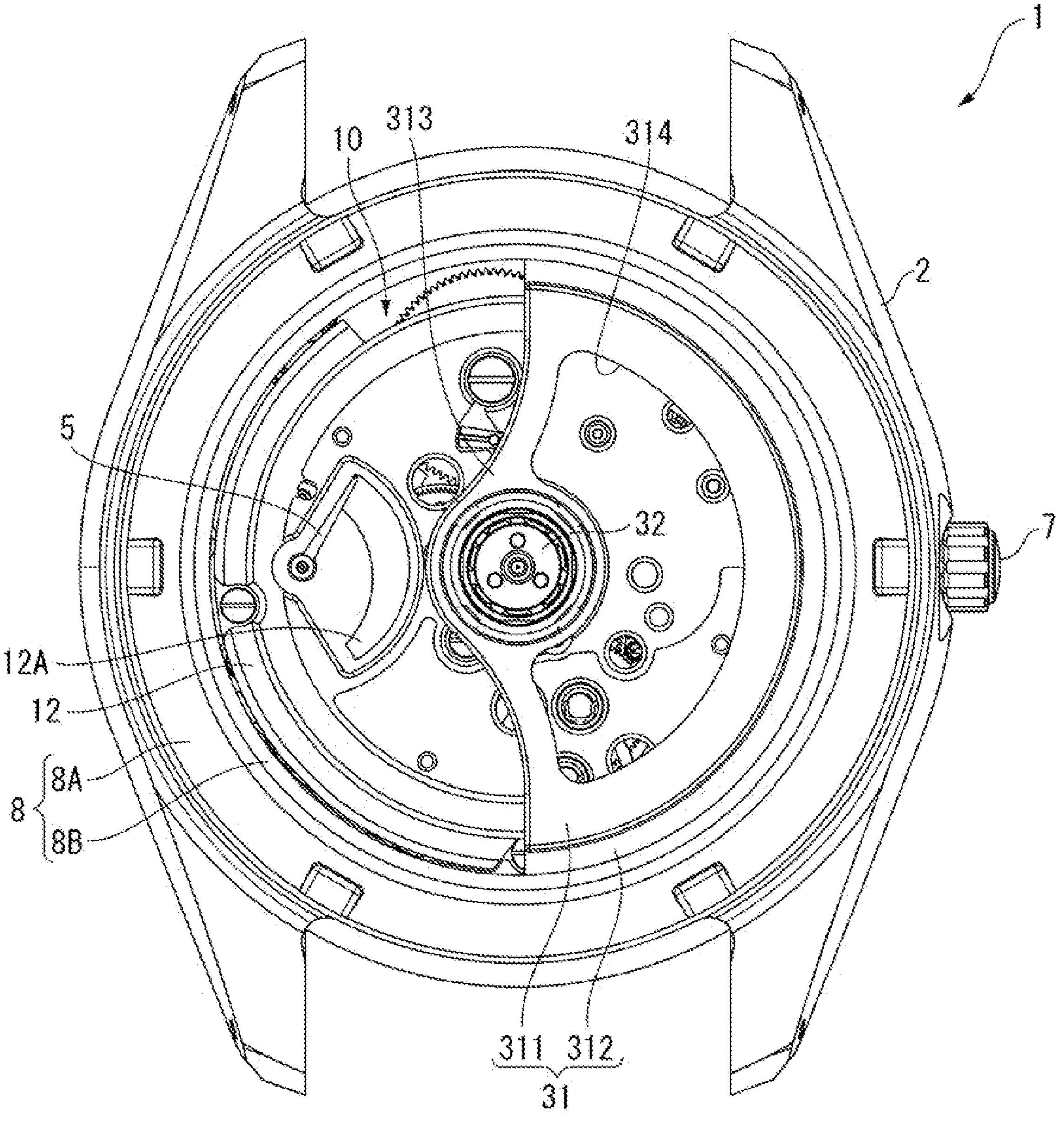
FIG. 2 is a rear view illustrating the electronically controlled mechanical watch.
Figure 3:
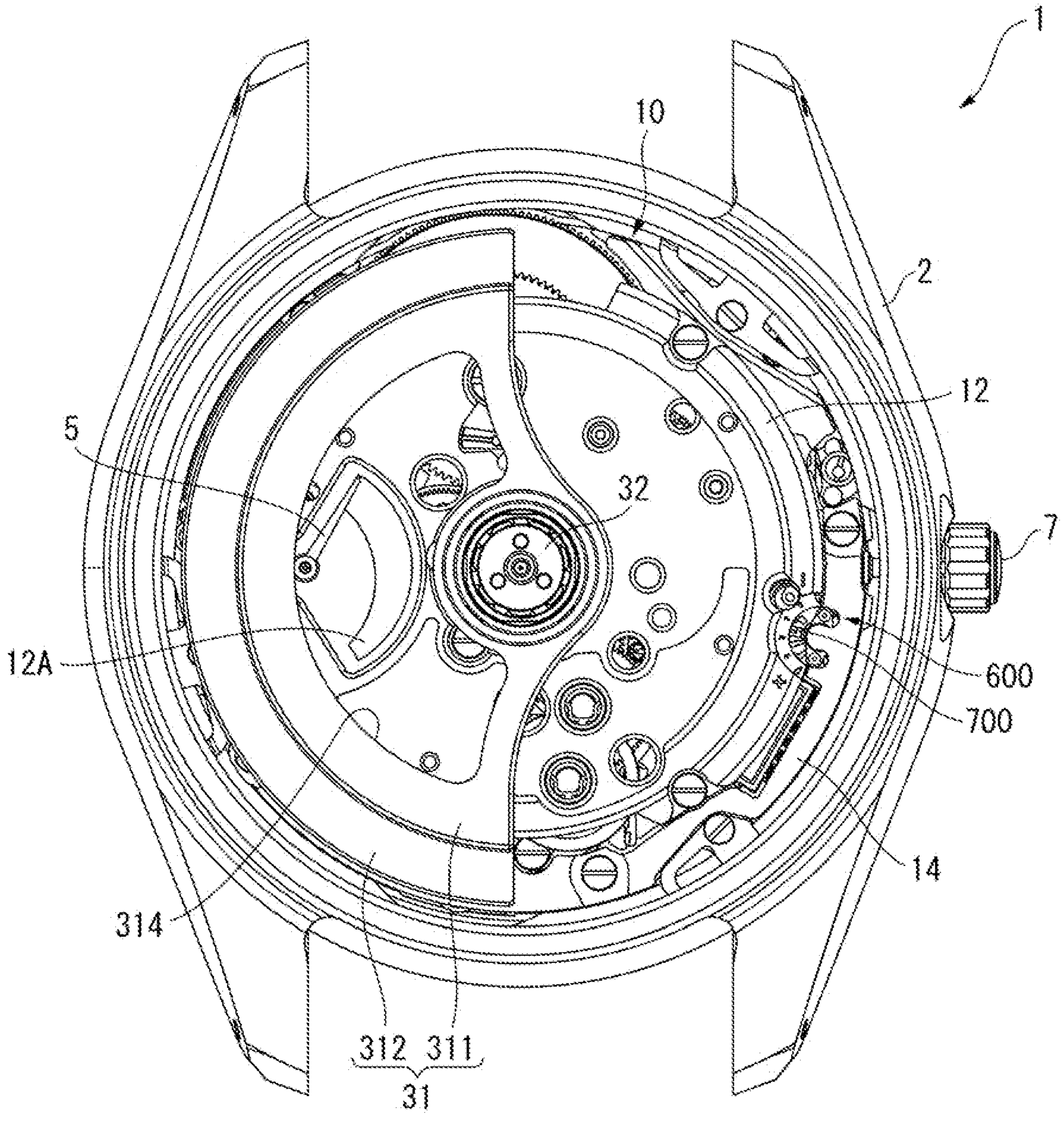
FIG. 3 is a rear view illustrating a state in which a back cover of the electronically controlled mechanical watch has been removed.

FIG. 1 is a front view illustrating an electronically controlled mechanical watch 1, FIG. 2 is a rear view illustrating the electronically controlled mechanical watch 1, and FIG. 3 is a rear view in a state in which a back cover 8 has been removed. The upper side of FIGS. 2 and 3 is the 6 o'clock side, and the lower side is the 12 o'clock side. The electronically controlled mechanical watch 1 of the present embodiment is called a skeleton type watch or a see-through type watch whose power reserve hand 5 can be viewed from the back side of the electronically controlled mechanical watch 1.

The electronically controlled mechanical watch 1 is a wristwatch worn on a wrist of a user, and includes a cylindrical exterior case 2, and the dial 3 is disposed on the inner circumference side of the exterior case 2. An opening on the front side between two openings of the exterior case 2 is closed with a cover glass, and the opening on the back side is closed with the back cover 8. The back cover 8 is configured of a ring-shaped frame 8A and a back cover glass 8B attached to the frame 8A.

The electronically controlled mechanical watch 1 includes a movement 10 accommodated in the exterior case 2, an hour hand 4A, a minute hand 4B, and a second hand 4C that indicate time information illustrated in FIG. 1, and the power reserve hand 5 indicating a remaining amount of winding-up of the mainspring illustrated in FIG. 2. A small calendar window 3A is provided in the dial 3, and a date wheel 6 can be visually recognized from the small calendar window 3A.

An opening 314 is formed in a oscillating weight 31 illustrated in FIGS. 2 and 3, and is configured so that the power reserve hand 5 is less visible depending on a position of the oscillating weight 31.

A fan-shaped indicator portion 12A is provided on a rear surface of a train wheel bridge 12, which will be described below. The remaining amount of winding-up of the mainspring can be indicated by pointing at the indicator portion 12A with the power reserve hand 5.

A crown 7 is provided on the side surface of the exterior case 2. The crown 7 can be pulled out and moved from a 0th stage position pushed toward a center of the electronically controlled mechanical watch 1 to a first stage position and a second stage position.

When the crown 7 is rotated to the 0th position, a mainspring 210 that is a mechanical energy source provided in the movement 10 can be wound, as will be described below. The power reserve hand 5 moves in conjunction with winding-up of the mainspring 210.

When the crown 7 is pulled to the first stage step position and rotated, a gear to which the rotation of the crown 7 is transmitted is switched by a switching mechanism 50, which will be described below, and the date wheel 6 can be moved to set the date. When the crown 7 is pulled to the second step position, the second hand 4C stops, and when the crown 7 is rotated at the second step position, the gear to which the rotation of the crown 7 is transmitted is switched by the switching mechanism 50, and the hour hand 4A and the minute hand 4B are moved, allowing adjustment by movement around. Since a configuration of the switching mechanism 50 and a method of correcting the date wheel 6, the hour hand 4A, and the minute hand 4B using the crown 7 are the same as those of a mechanical watch of the related art, description thereof is omitted.

Movement

Figure 4:
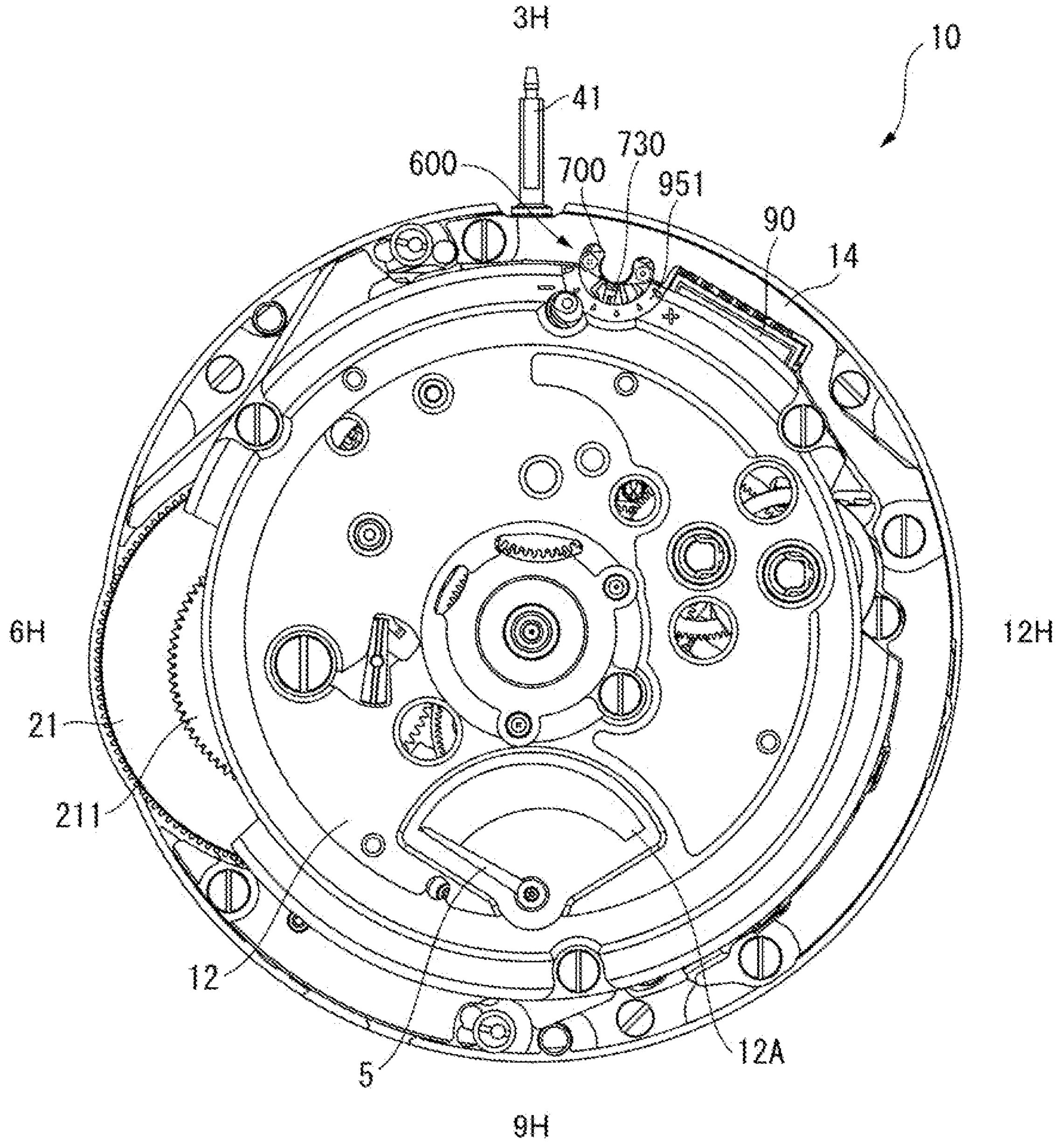
FIG. 4 is a rear view illustrating a state in which a oscillating weight of a movement of the electronically controlled mechanical watch has been removed.
Figure 5:
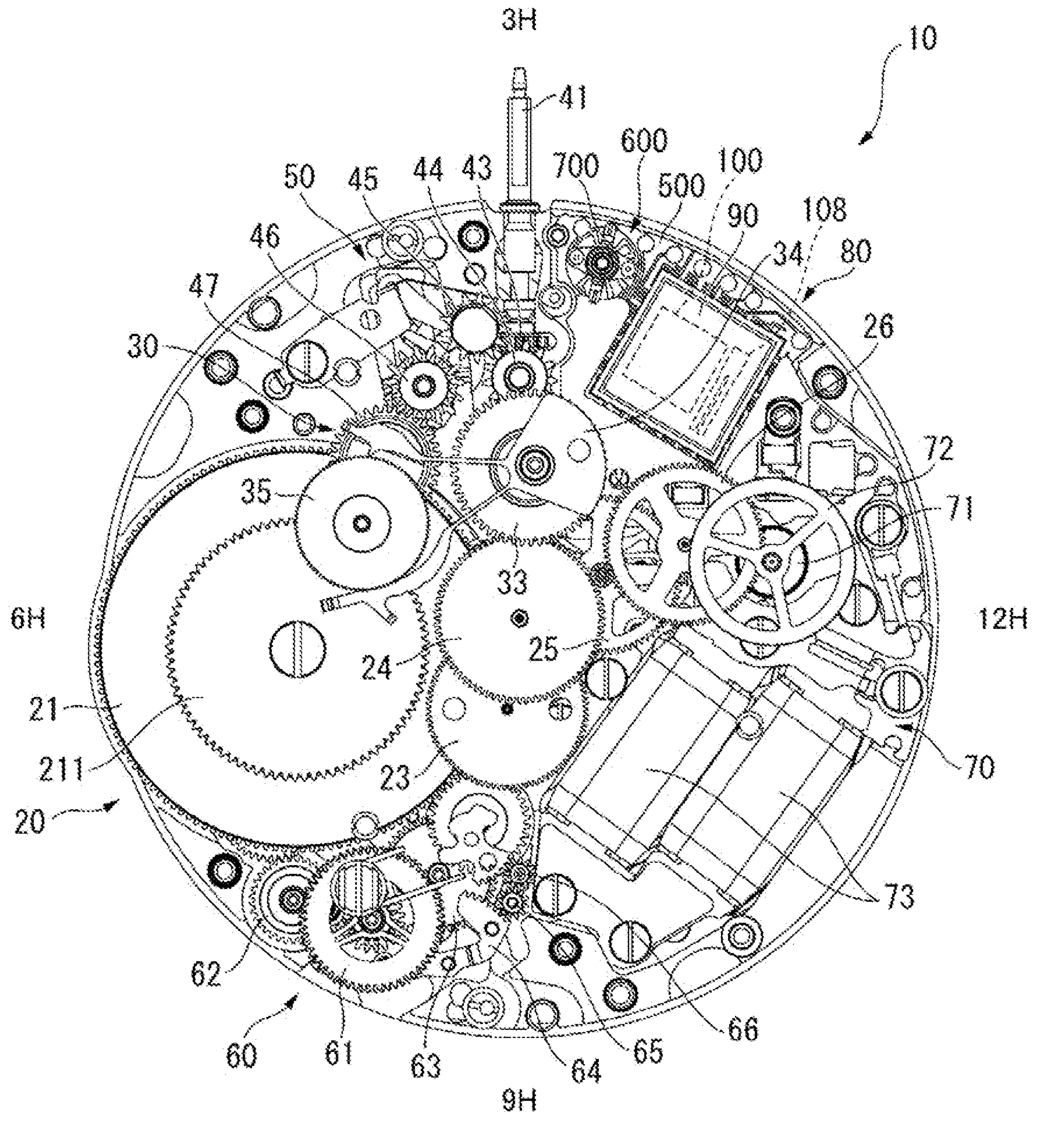
FIG. 5 is a rear view illustrating a state in which a train wheel bridge of the movement has been removed.
Figure 6:
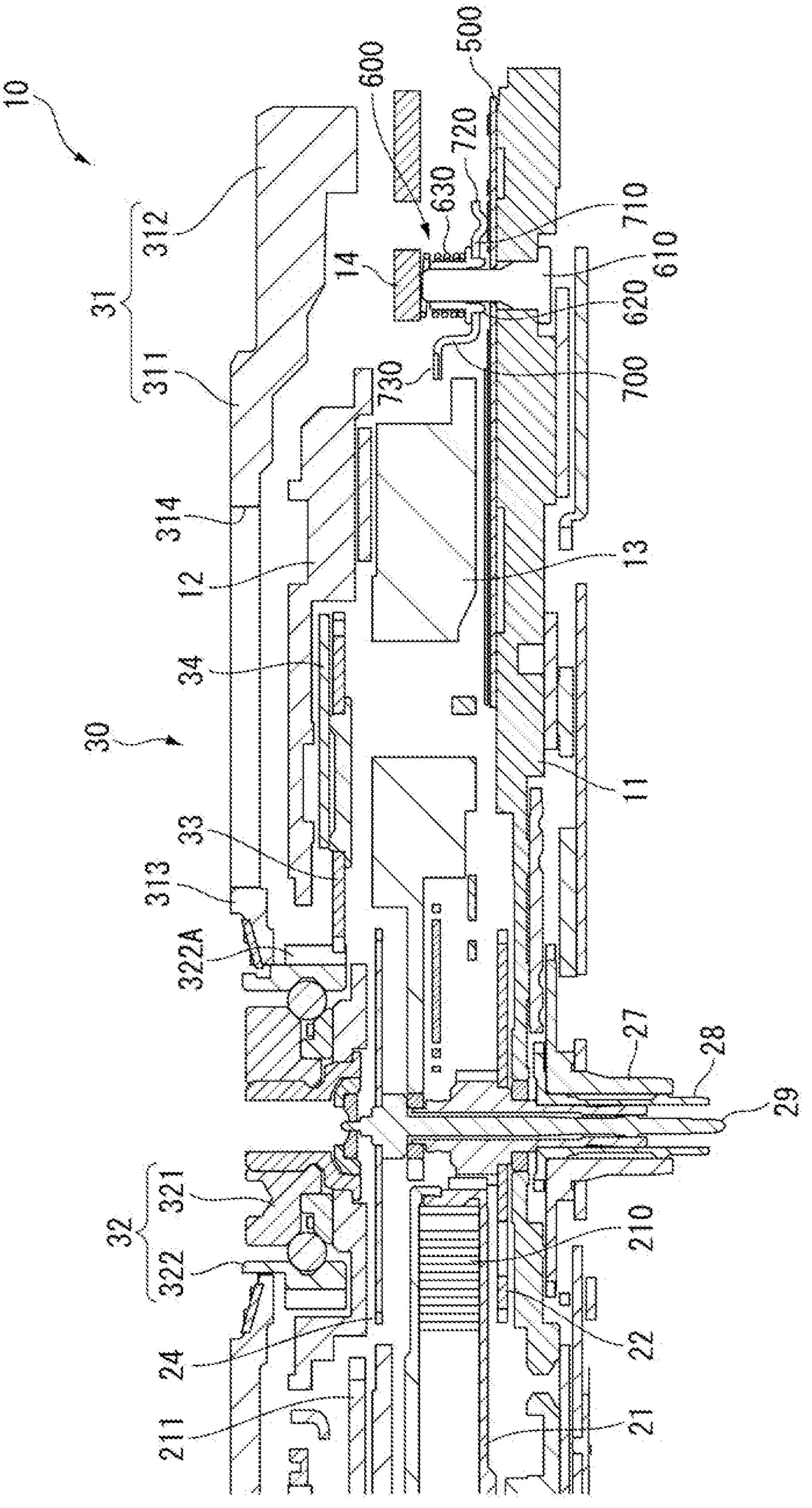
FIG. 6 is a cross-sectional view illustrating essential parts of the movement.

Next, the movement 10 will be described with reference to FIGS. 4 to 6, in addition to FIGS. 2 and 3. FIG. 4 is a rear view of essential parts of the movement 10 viewed from the back cover 8 side, and FIG. 5 is a rear view of the essential parts of the movement 10 from which a train wheel bridge 12 has been removed, viewed from the back cover 8 side. In FIGS. 4 and 5, a 3 o'clock side on which a winding stem 41 to which the crown 7 is attached is disposed is set as an upper side, a 9 o'clock side is set as a lower side, a 12 o'clock side is set as a right side, and a 6 o'clock side is set as a left side. FIG. 6 is a cross-sectional view of the essential parts of the movement 10.

The movement 10 includes a main plate 11, the train wheel bridge 12, and a second bridge 13, as illustrated in FIG. 6. The second bridge 13 is disposed between the main plate 11 and the train wheel bridge 12.

A time indication wheel train 20, a winding-up mechanism 30, the switching mechanism 50, a power reserve mechanism 60, a generator 70, and a circuit unit 80 are included between the main plate 11 and the train wheel bridge 12 as illustrated in FIG. 5.

The time indication wheel train 20 includes a barrel complete 21, a second wheel 22, a third wheel 23, a fourth wheel 24, a fifth wheel 25, and a sixth wheel 26, as illustrated in FIGS. 5 and 6. The mainspring 210 is accommodated in the barrel complete 21, and a central edge of the mainspring 210 is attached to a barrel arbor. A ratchet wheel 211 that rotates integrally with the barrel arbor is attached to the barrel arbor.

Therefore, when the ratchet wheel 211 is rotated, the mainspring 210, which is a mechanical energy source, can be wound, and when the barrel complete 21 is rotated by the mechanical energy accumulated by winding of this mainspring 210, the second wheel 22, the third wheel 23, the fourth wheel 24, the fifth wheel 25, and the sixth wheel 26 sequentially rotate. The sixth wheel 26 meshes with a rotor pinion of the generator 70, and when the sixth wheel 26 rotates, a rotor 71 of the generator 70 rotates. A rotor inertia disk 72 for stably rotating the rotor 71 is attached to the rotor 71.

As illustrated in FIG. 6, a pinion 28 is attached to the second wheel 22, and a second hand shaft 29 is attached to the fourth wheel 24. Further, an hour wheel 27 to which rotation of the pinion 28 is transmitted via a minute wheel (not illustrated) is disposed in an outer circumference of the pinion 28. The hour hand 4A, the minute hand 4B, and the second hand 4C are attached to the hour wheel 27, the pinion 28, and the second hand shaft 29, respectively.

The winding-up mechanism 30 includes an automatic winding-up mechanism and a manual winding-up mechanism.

The automatic winding-up mechanism includes the oscillating weight 31 and a bearing 32 illustrated in FIGS. 2 and 6, and an eccentric wheel 33, a pawl lever 34, and a transmission wheel 35 illustrated in FIG. 5.

The oscillating weight 31 includes a weight body portion 311 and a weight portion 312. The weight body portion 311 is formed in a thin plate shape and includes a central shaft portion 313 fixed to the bearing 32, and an opening 314. The weight portion 312 is formed continuously on an outer circumference of the weight body portion 311 and is formed to be thicker than the weight body portion 311. That is, in the oscillating weight 31, the weight body portion 311 and the weight portion 312 are integrally formed. Although the weight body portion 311 overlaps the train wheel bridge 12 in plan view, the weight portion 312 is configured not to overlap the train wheel bridge 12.

The bearing 32 is a bearing for rotatably supporting the oscillating weight 31, and includes an inner ring 321 fixed to the train wheel bridge 12, an outer ring 322 integrally rotating with the oscillating weight 31, and a ball disposed between the inner ring 321 and the outer ring 322. A gear 322A is formed on an outer circumference surface of the outer ring 322.

The eccentric wheel 33 meshes with the gear 322A of the bearing 32, and rotates forward and backward in conjunction with the rotation of the oscillating weight 31. Further, the eccentric wheel 33 includes an eccentric shaft provided to be eccentric from a rotation shaft of the eccentric wheel 33.

The pawl lever 34 is rotatably attached to an eccentric shaft of the eccentric wheel 33. When the eccentric wheel 33 rotates in conjunction with the oscillating weight 31, the pawl lever 34 attached to the eccentric wheel 33 advances and retreats toward and away from the transmission wheel 35, thereby rotating the transmission wheel 35 in one direction.

A pinion of the transmission wheel 35 meshes with the ratchet wheel 211, and the ratchet wheel 211 rotates in one direction in conjunction with the rotation of the transmission wheel 35. When the ratchet wheel 211 rotates, the barrel arbor rotates and the mainspring 210 is wound up.

The manual winding-up mechanism includes the winding stem 41 to which the crown 7 is attached, a clutch wheel (not illustrated), a winding pinion 43, a crown wheel 44, a first intermediate rachet wheel 45, a second intermediate rachet wheel 46, and a third intermediate rachet wheel 47, as illustrated in FIG. 5. The second intermediate rachet wheel 46 rotates integrally with a pinion of a separate body with a gear disposed coaxially with the opinion, and the third intermediate rachet wheel 47 meshes with the pinion of the transmission wheel 35. Therefore, when the crown 7 is rotated, the ratchet wheel 211 and the barrel arbor rotate via the transmission wheel 35, and the mainspring 210 is wound up.

Therefore, in the electronically controlled mechanical watch 1 of the present embodiment, it is possible to wind up the mainspring 210 by any one of the automatic winding-up mechanism and the manual winding-up mechanism. Therefore, a winding wheel train of the mainspring 210 includes the gear 322A of the outer ring 322 included in the automatic winding-up mechanism and the manual winding-up mechanism, the eccentric wheel 33, the pawl lever 34, the transmission wheel 35, the ratchet wheel 211, the clutch wheel, the winding pinion 43, the crown wheel 44, the first intermediate rachet wheel 45, the second intermediate rachet wheel 46, and the third intermediate rachet wheel 47.

As the electronically controlled mechanical watch 1, only one of the automatic winding-up mechanism and the manual winding-up mechanism may be provided.

The switching mechanism 50 is a mechanism that switches a transmission destination of the rotation force of the crown 7 according to an operation for pulling the crown 7, and includes the winding stem 41, the clutch wheel, the winding pinion 43, a setting lever, a yoke, a setting lever jumper, a lever for setting lever, a setting wheel, and the like. Since a configuration of the switching mechanisms 50 is the same as that of a general mechanical watch, description thereof will be omitted.

The power reserve mechanism 60 is a mechanism that indicates the remaining amount of winding-up of the mainspring 210, which is the drive source. The power reserve mechanism 60 includes a planetary gear mechanism 61, a winding indication train wheel 62, a rewinding-up indication train wheel 63, a first intermediate winding marking wheel 64, a second intermediate winding marking wheel 65, and a winding marking wheel 66, the fan-shaped indicator portion 12A disposed on the train wheel bridge 12 illustrated in FIG. 4, and the power reserve hand 5. A substantially strip-shaped indicator indicated by the power reserve hand 5 is indicated on the indicator portion 12A. Since a duration of the electronically controlled mechanical watch 1 can be estimated from the remaining amount of winding-up of the mainspring 210, which is the driving source, the duration can be indicated by the power reserve hand 5 when a number indicating the duration is printed on the indicator portion 12A.

The winding indication train wheel 62 is configured of a plurality of gears including a gear meshing with the barrel arbor, and rotates in conjunction with the rotation of the barrel arbor, that is, a winding-up operation of the mainspring 210. The rotation of the barrel arbor is transmitted to the planetary gear mechanism 61 via the winding indication train wheel 62.

The rewinding-up indication train wheel 63 is configured of a plurality of gears including a gear meshing with the barrel complete 21, and rotates in conjunction with the rotation of the barrel complete 21, that is, the rewinding of the mainspring 210. The rotation of the barrel complete 21 is transmitted to the planetary gear mechanism 61 via the rewinding-up indication train wheel 63.

Although details are omitted, the planetary gear mechanism 61 is configured to rotate the first intermediate winding marking wheel 64 in a first direction in conjunction with the winding of the mainspring 210, and rotate the first intermediate winding marking wheel 64 in a second direction opposite the first direction in conjunction with the rewinding of the mainspring 210.

The first intermediate winding marking wheel 64 rotates the winding marking wheel 66 via the second intermediate winding marking wheel 65. A power reserve hand 5 is attached to the shaft of the winding marking wheel 66.

The generator 70 includes the rotor 71, a rotor inertia disk 72, and a coil block 73, as illustrated in FIG. 5. The coil block 73 is constructed by winding a coil around each core.

Therefore, when the rotor 71 rotates due to an external torque, the generator 70 generates induced power using the coil block 73 and outputs electrical energy. Further, it is possible to apply the brake to the rotor 71 by short-circuiting the coil, and to regulate a rotation cycle of the rotor 71 to be constant by controlling braking force.

The circuit unit 80 includes a circuit board 500, an electronic control circuit 100 that is an IC, a rotary switch 600, a crystal oscillator 108, and various circuits such as a rectifier circuit and a power supply circuit. In the present embodiment, the electronic control circuit 100 and the crystal oscillator 108 are sealed in a reception container to form one package 90, as illustrated in FIG. 5. The electronic control circuit 100 and the crystal oscillator 108 are not limited to being enclosed in one package 90, and the electronic control circuit 100 and the crystal oscillator 108 may be separately attached to the circuit board 500.

Figure 7:
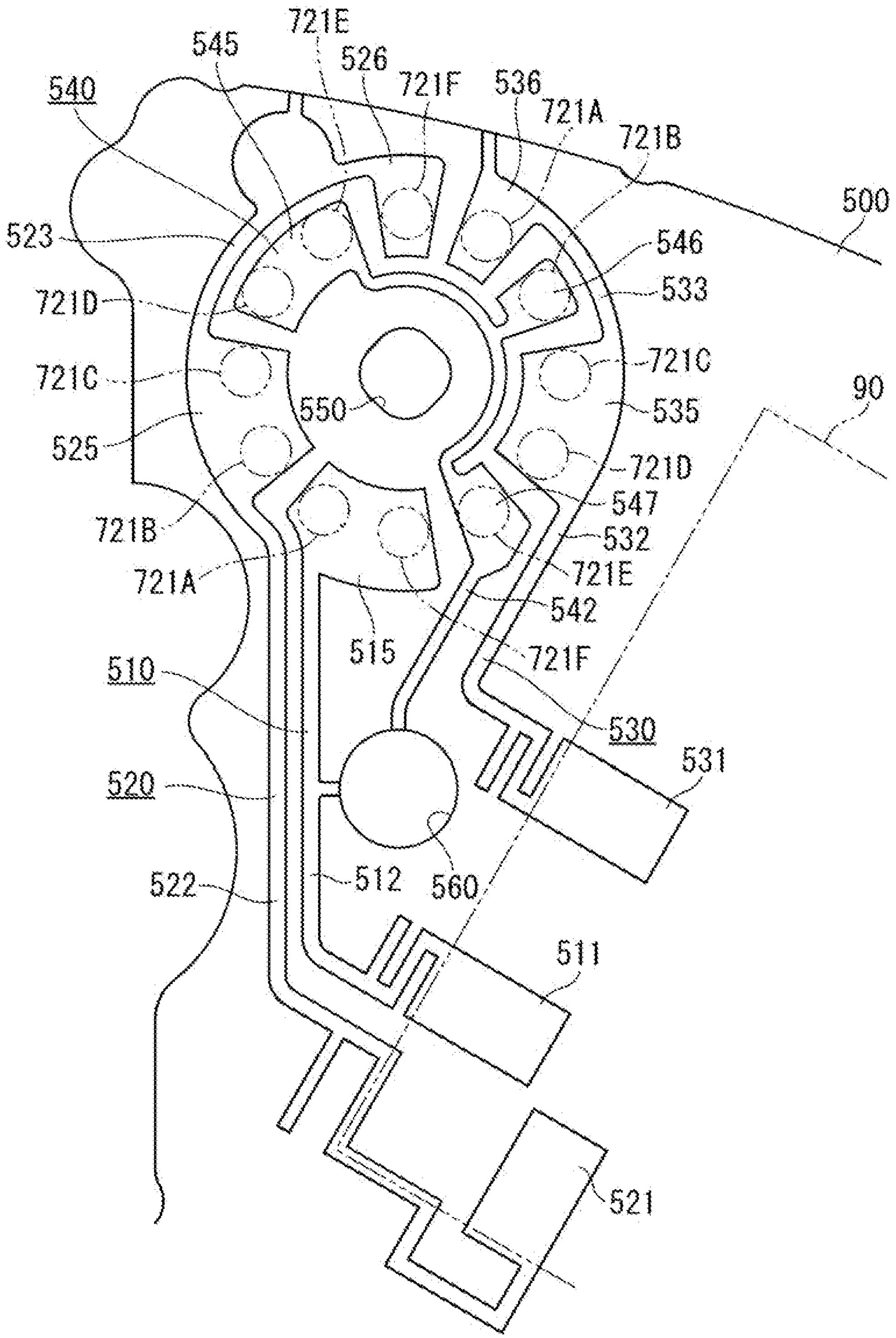
FIG. 7 is a plan view illustrating essential parts of a circuit board of the movement.

The circuit board 500 is disposed on a back surface of the main plate 11, that is, on a surface of the back cover side, as illustrated in FIG. 6. The package 90 or the like is attached to the circuit board 500, and as illustrated in FIGS. 5 and 7, logical regulation setting patterns 510, 520, and 530 and a dummy pattern 540 used for setting of a logical regulation value are formed at the end of the circuit board 500. The rotary switch 600 is provided at end of the circuit board 500 at which the patterns 510, 520, 530, and 540 are formed, that is, in the outer peripheral portion of the movement 10. Further, the rotary switch 600 is provided so as not to overlap the time indication wheel train 20, the winding-up mechanism 30, the switching mechanism 50, the power reserve mechanism 60, and the generator 70 in plan view in the movement 10. On the other hand, the rotary switch 600 is disposed at a position overlapping a rotation locus of the oscillating weight 31 in plan view.

A first logical regulation setting pattern 510 includes a pad 511, a wiring portion 512, and a contact portion 515.

The pad 511 is formed at a position overlapping the package 90 in plan view and is electrically coupled to the electronic control circuit 100 through a terminal of the package 90. The wiring portion 512 electrically couples the pad 511 to the contact portion 515. The contact portion 515 is formed in an annular fan shape around a through hole 550 formed in the circuit board 500.

The second logical regulation setting pattern 520 includes a pad 521, a first wiring portion 522, a second wiring portion 523, a first contact portion 525 and a second contact portion 526.

The pad 521 is formed at a position overlapping the package 90 in plan view, and is electrically coupled to electronic control circuit 100 via the terminal of the package 90. The first wiring portion 522 electrically couples the pad 521 to the first contact portion 525, and the second wiring portion 523 electrically couples the first contact portion 525 to the second contact portion 526. The first wiring portion 522 is formed substantially along the wiring portion 512. The second wiring portion 523 is formed in an arc shape along the outer circumferences of the first contact portion 525 and the second contact portion 526.

The third logical regulation setting pattern 530 includes a pad 531, a first wiring portion 532, a second wiring portion 533, a first contact portion 535, and a second contact portion 536.

The pad 531 is formed at a position overlapping the package 90 in plan view and is electrically coupled to the electronic control circuit 100 through the terminal of the package 90. The first wiring portion 532 electrically couples the pad 531 to the first contact portion 535, and the second wiring portion 533 electrically couples the first contact portion 535 to the second contact portion 536. The second wiring portion 533 is formed in an arc shape along outer circumferences of the first contact portion 535 and the second contact portion 536.

The dummy pattern 540 includes a wiring portion 542, a first contact portion 545, a second contact portion 546, and a third contact portion 547. The first contact portion 545 is formed at the inner circumference side of the second wiring portion 523, that is, between the first contact portion 525 and the second contact portion 526. The second contact portion 546 is formed at the inner circumference side of the second wiring portion 533, that is, between the first contact portion 535 and the second contact portion 536. The third contact portion 547 is formed between the contact portion 515 and the first contact portion 535.

The wiring portion 542 is formed in an arc shape along an outer circumference of the through hole 550 and is electrically coupled to the first contact portion 545, the second contact portion 546 and the third contact portion 547. The wiring portion 542 extends to a position of a through hole 560 formed in the circuit board 500.

Each of the patterns 510, 520, 530, and 540 formed at the circuit board 500 is formed by laminating a copper foil and a gold plating on a surface of the circuit board 500. Further, when the pattern is formed at the circuit board 500 using the copper foil, the dummy pattern 540 is conducted to the logical regulation setting pattern 510. In this state, the gold plating is formed at the copper foil. Thereafter, the through hole 560 is processed to separate the dummy pattern 540 from the logical regulation setting pattern 510. This makes it possible to form the gold plating in the patterns 510, 520, 530, and 540 at the same time, and improve the manufacturing efficiency of the patterns 510, 520, 530, and 540.

Rotary Switch

The rotary switch 600 includes a shaft member 610 attached to the main plate 11, a holding component 620 rotatably inserted into the shaft member 610, a coil spring 630 that biases the holding component 620 toward the circuit board 500, and a switch lever 700 held in the holding component 620, as illustrated in FIG. 6.

Figure 8:
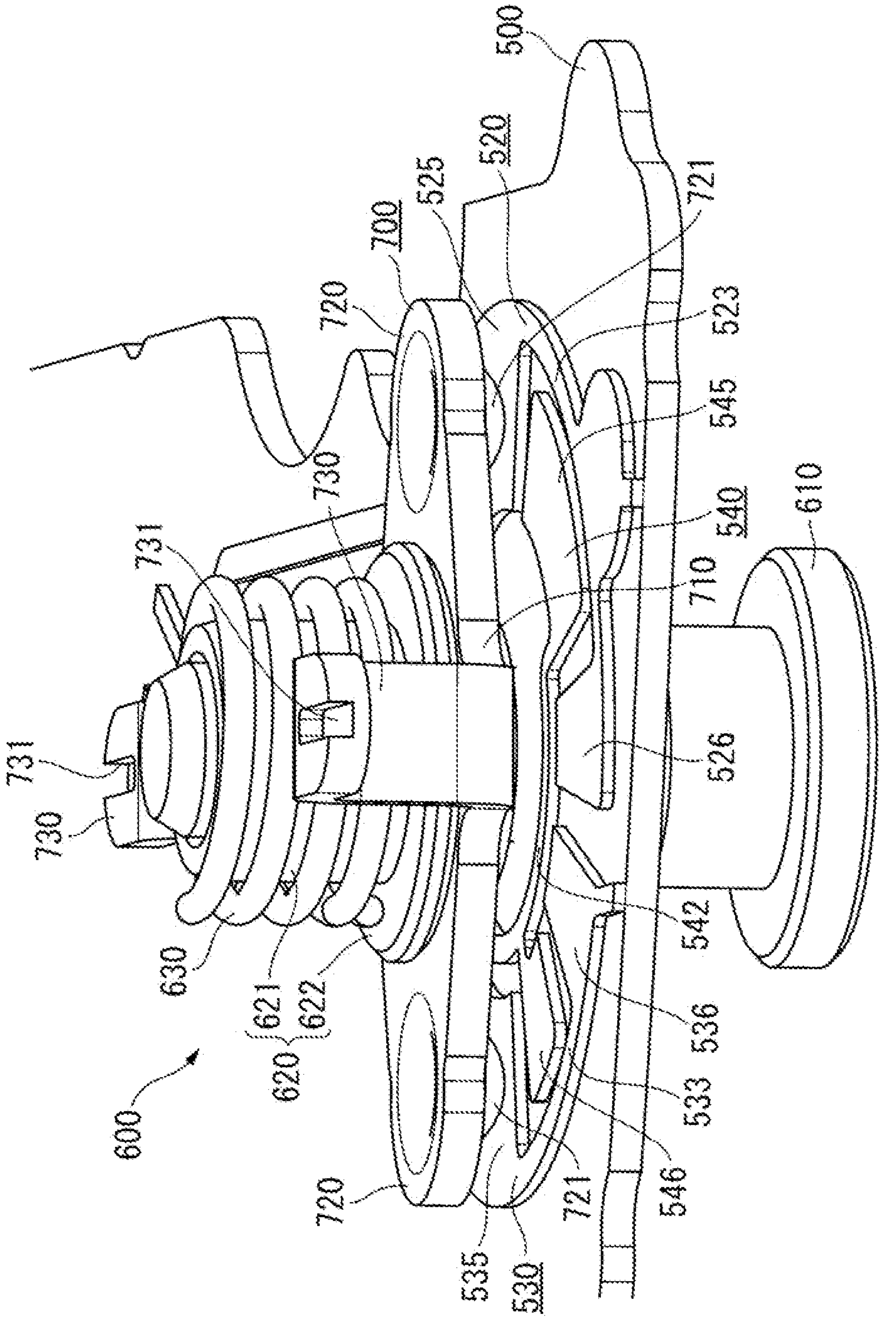
FIG. 8 is a perspective view illustrating a rotary switch provided on the circuit board.

The holding component 620 includes a rotation shaft portion 621 formed in a cylindrical shape and rotatably attached to the shaft member 610, and a flange portion 622 formed in an outer peripheral portion of the rotation shaft portion 621, as illustrated in FIG. 8.

The coil spring 630 is disposed between the flange portion 622 of the holding component 620 and a receiving component 14. The receiving component 14 is a part that is spaced apart from the main plate 11 and disposed to face a tip of the shaft member 610, and is disposed on the outer side of the train wheel bridge 12 and along the outer circumference of the movement 10, as illustrated in FIG. 4. The receiving component 14 is formed in an arc from a 3 o'clock position at which the winding stem 41 is disposed to a 10 o'clock position at which the coil block 73 of the generator 70 is disposed via a 12 o'clock position, and is disposed at a position at which, for example, a part of the circuit board 500 not covered with the train wheel bridge 12 is covered. The receiving component 14 is made of a metal plate and also functions as an anti-magnetic component. Further, the circuit board 500 can be pressed through a component such as a circuit receiver, and in this case, this also functions as a circuit pressing plate.

The switch lever 700 includes a base portion 710 in which a fitting hole that is fitted to the outer circumference of the rotation shaft portion 621 is formed, a pair of switch arms 720 that extend in opposite directions from the base portion 710, and an operation arm 730 extending in an opposite direction from the base portion 710, as illustrated in FIGS. 6 and 8. Although the switch arm 720 and the operation arm 730 are disposed in directions perpendicular to each other in plan view as illustrated in FIG. 8, the switch arms 720 and the operation arm 730, which are disposed to be orthogonal to each other, are shown at opposite positions for convenience in FIG. 6.

Each switch arm 720 is disposed along the surface of the circuit board 500, and a conduction portion 721 that protrudes toward the circuit board 500 is formed at a tip of the switch arm 720. A surface of the conduction portion 721 is formed in a spherical shape.

Figure 9:
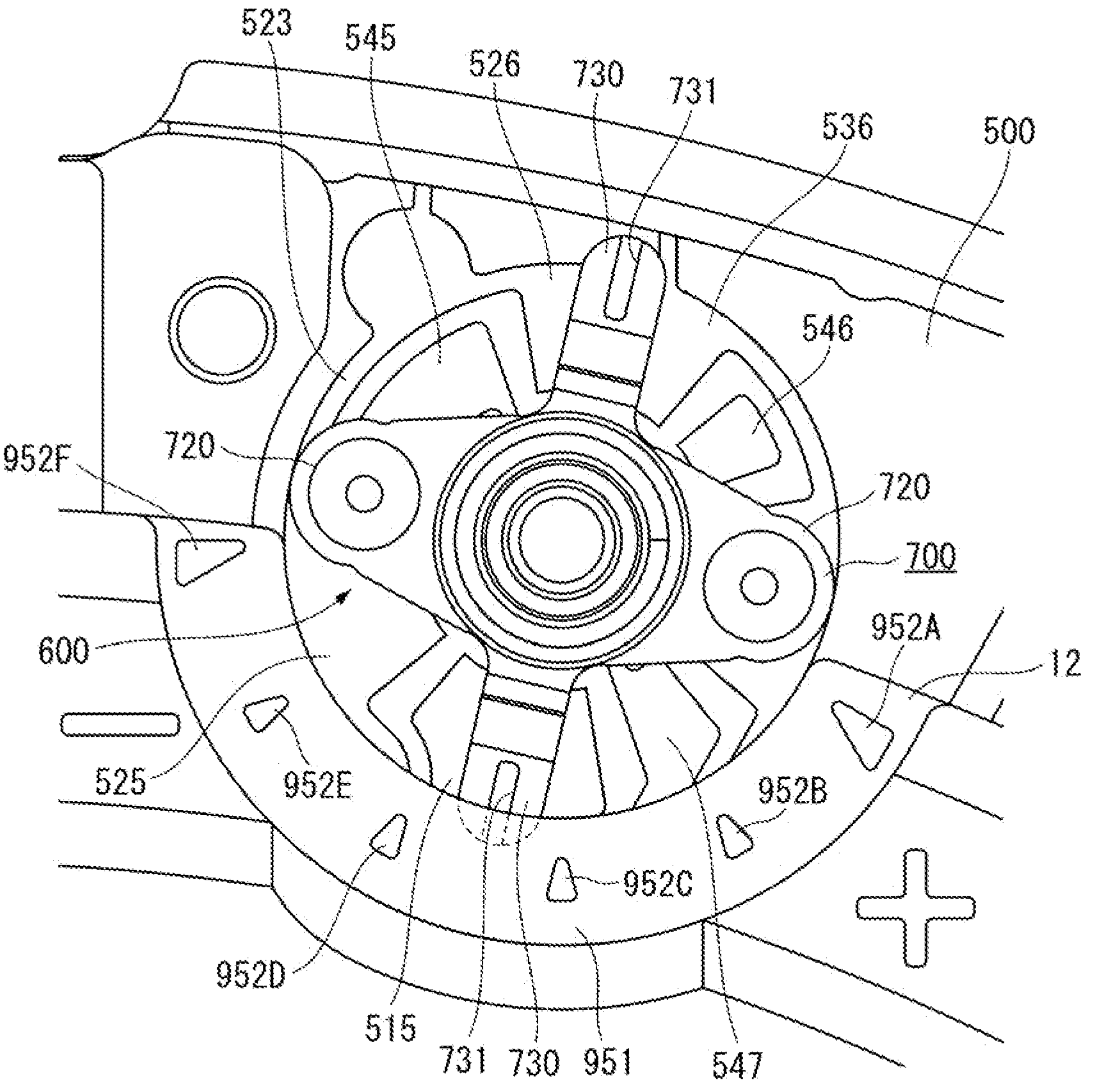
FIG. 9 is a plan view illustrating the rotary switch.

The operation arm 730 extends from the base portion 710 to the back cover and further extends to the outer peripheral side. A groove 731 is formed in an outer circumference end portion of the operation arm 730. In the train wheel bridge 12, an indicator portion 951 disposed on the back cover side of the operation arm 730 and formed in an arc shape along a locus of movement of the operation arm 730 is formed, as illustrated in FIGS. 4 and 9. Indicators 952A to 952F are formed at six locations at intervals of 30 degrees in the indicator portion 951. Further, the train wheel bridge 12 is marked with a plus sign and a minus sign. Therefore, a tip of the operation arm 730 is provided so as to overlap the indicator portion 951 of the train wheel bridge 12 in plan view, and parts other than the tip of the operation arm 730 are disposed on the outer peripheral side of the train wheel bridge 12 in plan view.

Further, in the receiving component 14, an arc-shaped groove is formed with a portion overlapping the shaft member 610 in plan view interposed, as illustrated in FIG. 4. An outer circumference of this groove continues to the indicator portion 951 of the train wheel bridge 12, and an arc-shaped groove is formed between the receiving component 14 and the indicator portion 951 to expose the operation arm 730. Therefore, it is possible to move and operate the operation arm 730 by inserting a jig such as tweezers into the groove.

Figure 10:
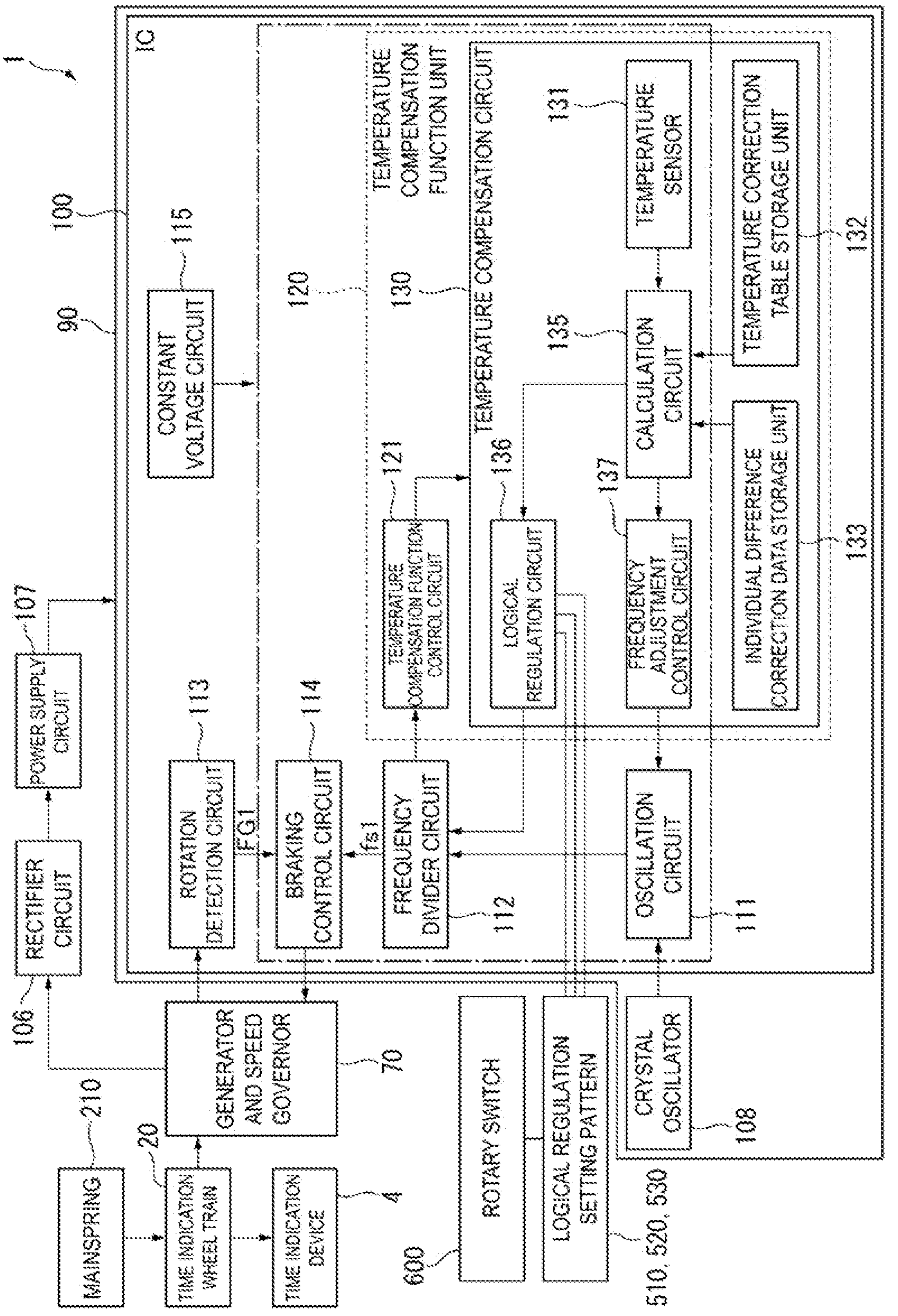
FIG. 10 is a block diagram illustrating the electronically controlled mechanical watch.

Next, a circuit configuration of the electronically controlled mechanical watch 1 will be described with reference to a block diagram of FIG. 10.

The electronically controlled mechanical watch 1 includes the mainspring 210 as a mechanical energy source, and the time indication wheel train 20 as an energy transmission device that transmits a torque of the mainspring 210, and includes a time indication device 4 that indicates a time, the generator 70 driven by a torque transmitted through the time indication wheel train 20, a rectifier circuit 106, a power supply circuit 107, the crystal oscillator 108, and the electronic control circuit 100.

The electronic control circuit 100 is configured of an IC manufactured by a silicon on insulator (SOI) process, and includes an oscillation circuit 111, a frequency divider circuit 112, a rotation detection circuit 113, a braking control circuit 114, a constant voltage circuit 115, and a temperature compensation function unit 120.

The time indication device 4 includes the time indication wheel train 20, respective hands including the hour hand 4A, the minute hand 4B, and the second hand 4C, the date wheel 6, and the dial 3 including an indicator of each hand and a date window.

In the generator 70, a magnetic flux changes as the rotor 71 rotates, so that induced power is generated in the coil and power generation is performed. Further, the generator 70 is also provided with a braking circuit that is controlled by the braking control circuit 114. The brake circuit short-circuits an output terminal of the generator 70 to apply a short brake, thereby causing the generator 70 to function as a speed governor.

The rectifier circuit 106 is coupled to the generator 70, and the electrical energy supplied from the generator 70 is accumulated in a power supply capacitor of the power supply circuit 107 via the rectifier circuit 106, and the electronic control circuit 100 is driven with a voltage generated across the power supply capacitor (power generation voltage).

The rectifier circuit 106 includes a step-up rectifier, full-wave rectifier, half-wave rectifier, transistor rectifier, or the like, and boosts and rectifies an AC output from the generator 70 to supply the output to the power supply circuit 107.

The oscillation circuit 111 oscillates the crystal oscillator 108, which is an oscillation signal generation source. The oscillation signal of the crystal oscillator 108 is output to the frequency divider circuit 112 including flip-flops.

The frequency divider circuit 112 divides a frequency of the oscillation signal to generate a clock signal at a plurality of frequencies (for example, 2 kHz to 8 Hz), and outputs the necessary clock signal to the braking control circuit 114 or the temperature compensation function unit 120. Here, the clock signal output from the frequency divider circuit 112 to the braking control circuit 114 is a reference signal fs1 that serves as a reference for rotation control of the rotor 71, as will be described below.

The rotation detection circuit 113 includes a waveform shaping circuit (not illustrated) coupled to the generator 70, and a mono-multivibrator, and outputs a rotation detection signal FG1 indicating a rotation frequency of the rotor 71 of the generator 70.

The braking control circuit 114 compares the rotation detection signal FG1 output from the rotation detection circuit 113 with the reference signal fs1 output from the frequency divider circuit 112, and outputs a braking control signal for regulating the speed of the generator 70 to the brake circuit of the generator 70. The reference signal fs1 is a signal that matches a reference rotational speed (for example, 8 Hz) of the rotor 71 at the time of normal hand movement. Therefore, the braking control circuit 114 changes a duty ratio of the braking control signal depending on a difference between a rotational speed of the rotor 71 (the rotation detection signal FG1) and the reference signal fs1, adjusts the braking force using the braking circuit, and controls the movement of the rotor 71.

The constant voltage circuit 115 is a circuit that converts the external voltage supplied from the power supply circuit 107 into a constant voltage and supplies the constant voltage.

Temperature Compensation Function Unit

The temperature compensation function unit 120 compensates for temperature characteristics of the crystal oscillator 108 and the like to suppress variation in the oscillation frequency, and includes a temperature compensation function control circuit 121, and a temperature compensation circuit 130.

The temperature compensation function control circuit 121 operates the temperature compensation circuit 130 at a predetermined timing.

The temperature compensation circuit 130 includes a temperature sensor 131 that is a temperature measurement unit, a temperature correction table storage unit 132, an individual difference correction data storage unit 133, a calculation circuit 135, a logical regulation circuit 136, and a frequency adjustment control circuit 137.

The temperature sensor 131 inputs to the calculation circuit 135 an output according to a temperature of an environment in which the electronically controlled mechanical watch 1 is used.

The temperature correction table storage unit 132 stores a temperature correction table in which how much the rate should be corrected at a certain temperature is set in the case of the ideal crystal oscillator 108 and the ideal temperature sensor 131.

However, since there is an individual differences according to manufacturing in the crystal oscillator 108 or the temperature sensor 131, individual difference correction data in which how much an individual difference should be corrected has been set based on characteristics of the crystal oscillator 108 or the temperature sensor 131 measured in a manufacturing or inspection process in advance is written to the individual difference correction data storage unit 133.

The calculation circuit 135 uses an output (temperature) of the temperature sensor 131, the temperature correction table stored in the temperature correction table storage unit 132, and the individual difference correction data stored in the individual difference correction data storage unit 133 to calculate the rate correction amount, and outputs a result of the calculation to the logical regulation circuit 136 and the frequency adjustment control circuit 137.

In the present embodiment, rate adjustment is performed using two methods of the logical regulation circuit 136 and the frequency adjustment control circuit 137.

The logical regulation circuit 136 is a circuit that digitally lengthens or shortens a cycle of the clock signal by inputting a set or reset signal to each frequency division stage of the frequency divider circuit 112 at a predetermined timing.

The frequency adjustment control circuit 137 is a circuit that adjusts the oscillation frequency itself of the oscillation circuit 111 by adjusting an additional capacitance of the oscillation circuit 111.

The first logical regulation setting pattern 510, the second logical regulation setting pattern 520, and the third logical regulation setting pattern 530 formed at the circuit board 500 are coupled to the logical regulation circuit 136, and the rotary switch 600 that can be conducted to the logical regulation setting patterns 510 to 530 are provided.

The rotary switch 600 can be operated by moving the operation arm 730 with a jig such as tweezers, as described above. By aligning the groove 731 of the operation arm 730 with positions of the respective indicators 952A to 952F, the conduction portion 721 of the switch arm 720 can be moved to six positions and selectively come into contact with each of the patterns 510 to 540. That is, the conduction portion 721 slides on a circumference with a rotation axis of the switch lever 700, that is, a central axis of the rotation shaft portion 621 or the shaft member 610, as a center by rotating the switch lever 700 of the rotary switch 600, and the respective patterns 510 to 540 are formed at the same circumference in a sliding area of the conduction portion 721 that slides on the circumference. Therefore, the conduction portion 721 selectively comes into contact with each of the patterns 510 to 540 due to the rotation of the switch lever 700 of the rotary switch 600.

The logical regulation circuit 136 of the electronic control circuit 100 detects which of the patterns 510 to 530 the conduction portion 721 is in contact with or that the conduction portion 721 comes into contact only with the dummy pattern 540 but does not come into contact with the patterns 510 to 530, that is, detects a conduction state between the conduction portion 721 and the logical regulation setting patterns 510 to 530, to adjust the logical regulation step in six stages as shown in Table 1.

TABLE 1

| | step | | | | | |
|---|---|---|---|---|---|---|
| pattern | −3 | −2 | −1 | ±0 | 1 | 2 |
| AS1 | 0 | 1 | 1 | 1 | 1 | 0 |
| AS2 | 0 | 1 | 1 | 0 | 0 | 1 |
| AS3 | 1 | 1 | 0 | 0 | 1 | 0 |

In Table 1, the pattern AS1 indicates the first logical regulation setting pattern 510, the pattern AS2 indicates the second logical regulation setting pattern 520, and the pattern AS3 indicates the third logical regulation setting pattern 530. The step indicates a step that is a set value of the logical regulation and, for example, when the step is changed from −2 to ±0 in a positive direction, the logical regulation is corrected in a forward direction, and when the step is changed in a negative direction, the logical regulation is corrected in a lagging direction. In Table 1, “1” indicates that each of the patterns 510 to 530 is “coupled to VDD” or “open”, and “0” indicates that each of the patterns 510 to 530 is “coupled to VSS”. In the present embodiment, since a potential of the switch arm 720 is set to VSS, the patterns 510 to 530 with which the conduction portion 721 is in contact are “coupled to VSS”, that is, are set to “0”, and the patterns 510 to 530 with which the conduction portion 721 is not in contact are set to “1”.

Therefore, in an after-sales service, when the back cover 8 is removed and the oscillating weight 31 is moved from a position overlapping the rotary switch 600, the rotary switch 600 is exposed from the groove between the indicator portion 951 of the train wheel bridge 12 and the receiving component 14, as illustrated in FIG. 4. The switch lever 700 can be rotated by operating the operation arm 730 exposed to this groove portion using a jig such as tweezers.

When the groove 731 of the operation arm 730 is aligned with each of the indicators 952A to 952F, the conduction portion 721 of each switch arm 720 extending in a direction orthogonal to the operation arm 730 is moved to any one of the positions 721A to 721F in FIG. 7. When the conduction portion 721 is moved to each of the positions 721A to 712F, each conduction portion 721 selectively comes into contact with each of the patterns 510, 520, 530, and 540, making it possible to set a logical regulation value. Therefore, when time accuracy is degraded due to deterioration of the crystal oscillator 108 over time, the switch lever 700 of the rotary switch 600 is operated to adjust the logical regulation value in the after-sales service, so that the time accuracy of the electronically controlled mechanical watch 1 can be maintained.

Operation and Effects of Embodiment

According to the present embodiment, in the electronically controlled mechanical watch 1 that indicates a time according to the torque from the mainspring 210, which is the mechanical energy source, it is possible to change the set value of the logical regulation by operating the rotary switch 600. Therefore, even when the rate changes year by year due to the aging of the crystal oscillator 108, it is possible to correct an amount of rate aging change and to easily perform rate adjustment work in the after-sales service by removing the back cover 8 and rotating the switch lever 700 in the after-sales service. Therefore, by electronically regulating the speed of the time indication wheel train 20 while using the mainspring 210 as a driving source, it is possible to maintain the precision of the electronically controlled mechanical watch 1, which is more accurate than that of a mechanical watch, for a long period of time by adjusting the rate in the after-sales service.

Since the rotary switch 600 is provided in the outer peripheral portion of the movement 10, there is little interference with other components in terms of layout, and thus, a sufficient space in which the rotary switch 600 is disposed can be secured without increasing a diameter of the movement 10.

Since the rotary switch 600 is provided so as not to overlap the time indication wheel train 20, the winding wheel train, the switching mechanism 50, the power reserve mechanism 60, and the generator 70 in plan view, the movement 10, that is, the electronically controlled mechanical watch 1 can be made thinner.

The shaft member 610, the holding component 620, and the coil spring 630 of the rotary switch 600 are disposed on the outer side of the train wheel bridge 12 in plan view, and a tip at which the groove 731 of the operation arm 730 of the switch lever 700 has been formed overlaps the indicator portion 951 of the train wheel bridge 12 in plan view, but at least a part of the operation arm 730, specifically, a portion extending from the base portion 710 of the switch lever 700 to the back cover and further extending to the outer peripheral side is disposed on the outer peripheral side of the indicator portion 951 of the train wheel bridge 12 except for the tip, the operation arm 730 can be easily operated from a position of the receiving component 14. That is, a distance from a surface on the back cover side of the receiving component 14 to the operation arm 730 is smaller than a distance from a surface on the back cover side of the train wheel bridge 12 to the operation arm 730. Therefore, since the operation arm 730 can be operated from the receiving component 14 portion when at least a part of the operation arm 730 of the rotary switch 600 is disposed on the outer peripheral side of the train wheel bridge 12, it is possible to easily operate the operation arm 730, as compared with a case in which the rotary switch 600 is covered with the train wheel bridge 12, an opening is formed in the train wheel bridge 12, and the operation arm 730 is operated through the opening.

Since the train wheel bridge 12 is configured to overlap the weight body portion 311 of the oscillating weight 31 in plan view, but not to overlap the thick weight portion 312, the electronically controlled mechanical watch 1 can be made thinner.

Further, since the rotary switch 600 is disposed at a position overlapping the rotation locus of the oscillating weight 31 in plan view, it is possible to miniature the electronically controlled mechanical watch 1 as compared with a case in which the rotary switch is disposed on the outer peripheral side of the rotation locus of the oscillating weight 31. Further, since the oscillating weight 31 is movable in a rotational direction, the oscillating weight 31 can be manually moved to a position not overlapping the rotary switch 600 when the rotary switch 600 is operated, and thus, it is possible to operate the rotary switch 600 without disturbance from the oscillating weight 31.

Since the train wheel bridge 12 is provided with an opening at a position overlapping a rotation area of the rotary switch 600, and the indicator portion 951 is provided along this opening, and the respective indicators 952A to 952F are marked, a set position of the rotary switch 600 can be indicated appropriately.

Further, since the operation arm 730 of the rotary switch 600 is exposed in the arc-shaped opening between the indicator portion 951 of the train wheel bridge 12 and the receiving component 14, it is possible to operate the rotary switch 600 in a completed state of the movement 10. Therefore, in the after-sales service, it is also possible to operate the rotary switch 600 by removing only the back cover 8, and to easily perform logical regulation value adjustment work.

Other Embodiments

The present disclosure is not limited to each the embodiments, and various modifications can be made within the scope of the gist of the present disclosure.

Although the rotary switch 600 is provided in the outer peripheral portion of the movement 10, the rotary switch 600 may be provided at a place other than the outer peripheral portion of the movement 10, such as a position on the center side of the movement 10 relative to the electronic control circuit 100 in the circuit board 500, as long as this does not interfere with other components.

Although the rotary switch 600 is provided at the position not overlapping the time indication wheel train 20, the generator 70, a winding wheel train of the winding-up mechanism 30, and the switching mechanism 50 in plan view, a layout in which the time indication wheel train 20, the generator 70, the winding wheel train of the winding-up mechanism 30, a part of the switching mechanism 50, and a part of the rotary switch 600 overlap in plan view may be adopted as long as a layout and an operation are possible.

The rotary switch 600 is not limited to being disposed on the outer peripheral side of the train wheel bridge 12, and may be disposed at a position overlapping the train wheel bridge 12 in plan view. In this case, an opening for operating the rotary switch 600 may be formed in the train wheel bridge 12.

The rotary switch 600 is not limited to being disposed so as to overlap the oscillating weight 31 in plan view, and may be disposed on the outer side of the rotation locus of the oscillating weight 31. However, when the rotary switch 600 is disposed so as to overlap the oscillating weight 31 in plan view, there is an effect that it is possible to miniaturize the electronically controlled mechanical watch 1.

A configuration of the rotary switch is not limited to the above embodiment, and for example, a switch lever that is rotatable by a jig such as a screwdriver may be used without the operation arm.

Conclusion of Present Disclosure

An electronically controlled mechanical watch according to the present includes: a mechanical energy source; a time indication device including a time indication wheel train configured to indicate a time using a transmitted torque of the mechanical energy source; a circuit board on which a crystal oscillator, an electronic control circuit configured to adjust a rotation speed of the time indication wheel train based on an oscillation frequency of the crystal oscillator, and a plurality of logical regulation setting patterns are disposed; and a rotary switch including a conduction portion allowing conduction with respect to the logical regulation setting pattern, the rotary switch being capable of selecting the logical regulation setting pattern conducting to the conduction portion by rotating with respect to the circuit board, wherein the electronic control circuit includes: an oscillation circuit configured to oscillate the crystal oscillator; a frequency divider circuit configured to divide an oscillation signal output from the oscillation circuit and output a reference signal; and a logical regulation circuit configured to control the frequency divider circuit based on a conduction state of the conduction portion and the logical regulation setting pattern.

In the electronically controlled mechanical watch, it is possible to change the set value of the logical regulation by operating the rotary switch. Therefore, even when the rate changes year by year due to the aging of the crystal oscillator, it is possible to correct the amount of rate aging change and to easily perform the rate adjustment work in the after-sales service by removing the back cover and rotating the switch lever in the after-sales service. Therefore, by electronically regulating the speed of the time indication wheel train driven by a mechanical energy source, it is possible to maintain the precision of the electronically controlled mechanical watch, which is more accurate than that of a mechanical watch, for a long period of time by adjusting the rate in the after-sales service.

In the electronically controlled mechanical watch of the present disclosure, it is preferable for the rotary switch to be provided in the outer peripheral portion of the movement accommodated in the clock case.

Since the rotary switch is provided in the outer peripheral portion of the movement, there is little interference with other components in terms of layout, and thus, a sufficient space in which the rotary switch is disposed can be secured without increasing the diameter of the movement.

It is preferable that the electronically controlled mechanical watch of the present disclosure includes a winding wheel train configured to wind up the mechanical energy source; a generator including a rotor configured to be driven by the mechanical energy source; and a switching mechanism configured to switch a transmission destination of a rotation force of a crown according to an operation for pulling the crown, wherein the rotary switch is provided so as not to overlap the time indication wheel train, the generator, the winding wheel train, and the switching mechanism in plan view.

Since the rotary switch is provided so as not to overlap the time indication wheel train, the winding wheel train, the switching mechanism, the power reserve mechanism, and the generator in plan view, the movement, that is, the electronically controlled mechanical watch, can be made thinner.

It is preferable that the electronically controlled mechanical watch of the present disclosure includes a train wheel bridge configured to hold the time indication wheel train, wherein the rotary switch includes a shaft member, and a switch lever rotatably provided with respect to the shaft member and having an operation arm, and at least part of the operation arm is disposed on the outer peripheral side of the train wheel bridge in plan view.

Since the rotary switch includes the shaft member and the switch lever, and at least a part of the operation arm of the switch lever is disposed on the outer peripheral side of the train wheel bridge in plan view, the operation arm can be easily operated.

It is preferable that the electronically controlled mechanical watch of the present disclosure includes a train wheel bridge configured to hold the time indication wheel train; a winding wheel train configured to wind up the mechanical energy source; and a oscillating weight configured to drive the winding wheel train, wherein the oscillating weight includes a weight body portion and a weight portion that is provided on the outer peripheral side of the weight body portion and thicker than the weight body portion, and the train wheel bridge overlaps the weight body portion and does not overlap with the weight portion in plan view.

Since the train wheel bridge overlaps the weight body portion of the oscillating weight in plan view, but is configured not to overlap the thick weight portion, the electronically controlled mechanical watch can be made thinner.

It is preferable that the electronically controlled mechanical watch of the present disclosure includes a train wheel bridge configured to hold the time indication wheel train; a winding wheel train configured to wind up the mechanical energy source; and a oscillating weight configured to drive the winding wheel train, wherein the electronically controlled mechanical watch, and the rotary switch is disposed so as to overlap the oscillating weight in plan view.

Since the rotary switch is disposed at the position overlapping the rotation locus of the oscillating weight in plan view, it is possible to miniaturize the electronically controlled mechanical watch as compared with a case in which the rotary switch is disposed on the outer peripheral side of the rotation locus of the oscillating weight. Further, since the oscillating weight is movable in the rotational direction, the oscillating weight can be manually moved to a position not overlapping the rotary switch when the rotary switch is operated, and thus, it is possible to operate the rotary switch without disturbance from the oscillating weight.

It is preferable that the electronically controlled mechanical watch of the present disclosure includes a train wheel bridge configured to hold the time indication wheel train, wherein the train wheel bridge is provided with an opening at a position overlapping a rotation area of the rotary switch, and an indicator indicating a set position of the rotary switch is marked along the opening.

Since the train wheel bridge is provided with the opening at the position overlapping with the rotation area of the rotary switch, and the indicator portion is provided along this opening to mark each indicator, it is possible to appropriately indicate the set position of the rotary switch.

What is claimed is:

1. An electronically controlled mechanical watch, comprising:

a mechanical energy source;

a time indication device including a time indication wheel train configured to indicate a time using a transmitted torque of the mechanical energy source;

a circuit board on which a crystal oscillator, an electronic control circuit configured to adjust a rotation speed of the time indication wheel train based on an oscillation frequency of the crystal oscillator, and a plurality of logical regulation setting patterns are disposed; and a rotary switch including a conduction portion configured to conduct to the plurality of logical regulation setting patterns, the rotary switch being configured to rotate with respect to the circuit board to select a logical regulation setting pattern, of the plurality of logical regulation setting patterns, conducting to the conduction portion, wherein the electronic control circuit includes:

an oscillation circuit configured to oscillate the crystal oscillator;

a frequency divider circuit configured to divide an oscillation signal output from the oscillation circuit and output a reference signal; and a logical regulation circuit configured to control the frequency divider circuit based on a conduction state of the conduction portion and the logical regulation setting pattern, and the rotary switch is provided at an outer peripheral portion of a movement housed in a watch case.

2. The electronically controlled mechanical watch according to claim 1, further comprising:

a winding wheel train configured to wind up the mechanical energy source;

a generator including a rotor configured to be driven by the mechanical energy source; and a mechanical switch configured to switch a transmission destination of a rotation force of a crown based on an operation for pulling the crown, wherein the rotary switch is provided so as not to overlap the time indication wheel train, the generator, the winding wheel train, and the mechanical switch in a plan view.

3. The electronically controlled mechanical watch according to claim 1, further comprising a train wheel bridge configured to hold the time indication wheel train, wherein the rotary switch includes a shaft member, and a switch lever rotatably provided with respect to the shaft member and including an operation arm, and at least part of the operation arm is disposed on an outer peripheral side of the train wheel bridge in a plan view.

4. The electronically controlled mechanical watch according to claim 1, further comprising:

a train wheel bridge configured to hold the time indication wheel train;

a winding wheel train configured to wind up the mechanical energy source; and an oscillating weight configured to drive the winding wheel train, wherein the oscillating weight includes a weight body portion and a weight portion that is provided on an outer peripheral side of the weight body portion and thicker than the weight body portion, and the train wheel bridge overlaps the weight body portion and does not overlap the weight portion in a plan view.

5. The electronically controlled mechanical watch according to claim 1, further comprising:

a train wheel bridge configured to hold the time indication wheel train;

a winding wheel train configured to wind up the mechanical energy source; and an oscillating weight configured to drive the winding wheel train, wherein the rotary switch is disposed so as to overlap the oscillating weight in a plan view.

6. The electronically controlled mechanical watch according to claim 1, further comprising a train wheel bridge configured to hold the time indication wheel train, wherein the train wheel bridge is provided with an opening at a position overlapping a rotation area of the rotary switch, and an indicator indicating a set position of the rotary switch is marked along the opening.

7. An electronically controlled mechanical watch comprising:

a mechanical energy source;

a time indication device including a time indication wheel train configured to indicate a time using a transmitted torque of the mechanical energy source;

a circuit board on which a crystal oscillator, an electronic control circuit configured to adjust a rotation speed of the time indication wheel train based on an oscillation frequency of the crystal oscillator, and a plurality of logical regulation setting patterns are disposed;

a rotary switch including a conduction portion configured to conduct to the plurality of logical regulation setting patterns, the rotary switch being configured to rotate with respect to the circuit board to select a logical regulation setting pattern, of the plurality of logical regulation setting patterns, conducting to the conduction portion;

a winding wheel train configured to wind up the mechanical energy source;

a generator including a rotor configured to be driven by the mechanical energy source; and a mechanical switch configured to switch a transmission destination of a rotation force of a crown based on an operation for pulling the crown, wherein the electronic control circuit includes:

an oscillation circuit configured to oscillate the crystal oscillator;

a frequency divider circuit configured to divide an oscillation signal output from the oscillation circuit and output a reference signal; and a logical regulation circuit configured to control the frequency divider circuit based on a conduction state of the conduction portion and the logical regulation setting pattern, and the rotary switch is provided so as not to overlap the time indication wheel train, the generator, the winding wheel train, and the mechanical switch in a plan view.

8. An electronically controlled mechanical watch comprising:

a mechanical energy source;

a time indication device including a time indication wheel train configured to indicate a time using a transmitted torque of the mechanical energy source;

a circuit board on which a crystal oscillator, an electronic control circuit configured to adjust a rotation speed of the time indication wheel train based on an oscillation frequency of the crystal oscillator, and a plurality of logical regulation setting patterns are disposed;

a rotary switch including a conduction portion configured to conduct to the plurality of logical regulation setting patterns, the rotary switch being configured to rotate with respect to the circuit board to select a logical regulation setting pattern, of the plurality of logical regulation setting patterns, conducting to the conduction portion; and a train wheel bridge configured to hold the time indication wheel train, wherein the electronic control circuit includes:

an oscillation circuit configured to oscillate the crystal oscillator;

a frequency divider circuit configured to divide an oscillation signal output from the oscillation circuit and output a reference signal; and a logical regulation circuit configured to control the frequency divider circuit based on a conduction state of the conduction portion and the logical regulation setting pattern, the rotary switch includes a shaft member, and a switch lever rotatably provided with respect to the shaft member and including an operation arm, and at least part of the operation arm is disposed on an outer peripheral side of the train wheel bridge in a plan view.

9. An electronically controlled mechanical watch comprising:

a mechanical energy source;

a time indication device including a time indication wheel train configured to indicate a time using a transmitted torque of the mechanical energy source;

a circuit board on which a crystal oscillator, an electronic control circuit configured to adjust a rotation speed of the time indication wheel train based on an oscillation frequency of the crystal oscillator, and a plurality of logical regulation setting patterns are disposed;

a rotary switch including a conduction portion configured to conduct to the plurality of logical regulation setting patterns, the rotary switch being configured to rotate with respect to the circuit board to select a logical regulation setting pattern, of the plurality of logical regulation setting patterns, conducting to the conduction portion;

a train wheel bridge configured to hold the time indication wheel train;

a winding wheel train configured to wind up the mechanical energy source; and an oscillating weight configured to drive the winding wheel train, wherein the electronic control circuit includes:

an oscillation circuit configured to oscillate the crystal oscillator;

a frequency divider circuit configured to divide an oscillation signal output from the oscillation circuit and output a reference signal; and a logical regulation circuit configured to control the frequency divider circuit based on a conduction state of the conduction portion and the logical regulation setting pattern, and the rotary switch is disposed so as to overlap the oscillating weight in a plan view.

10. An electronically controlled mechanical watch comprising:

a mechanical energy source;

a time indication device including a time indication wheel train configured to indicate a time using a transmitted torque of the mechanical energy source;

a circuit board on which a crystal oscillator, an electronic control circuit configured to adjust a rotation speed of the time indication wheel train based on an oscillation frequency of the crystal oscillator, and a plurality of logical regulation setting patterns are disposed;

a rotary switch including a conduction portion configured to conduct to the plurality of logical regulation setting patterns, the rotary switch being configured to rotate with respect to the circuit board to select a logical regulation setting pattern, of the plurality of logical regulation setting patterns, conducting to the conduction portion; and a train wheel bridge configured to hold the time indication wheel train, wherein the electronic control circuit includes:

an oscillation circuit configured to oscillate the crystal oscillator;

a frequency divider circuit configured to divide an oscillation signal output from the oscillation circuit and output a reference signal; and a logical regulation circuit configured to control the frequency divider circuit based on a conduction state of the conduction portion and the logical regulation setting pattern, and the train wheel bridge is provided with an opening at a position overlapping a rotation area of the rotary switch, and an indicator indicating a set position of the rotary switch is marked along the opening.

* * * * *